(12) United States Patent
Al-Arfaj (10) Patent No.: US 11,835,494 B2
(45) Date of Patent: Dec. 5, 2023

(54) FLUIDIZED BED FOR INDUSTRIAL HYGIENE APPLICATIONS

(71) Applicant: Saudi Arabian Oil Company, Dhahran (SA)

(72) Inventor: Ayman Al-Arfaj, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 497 days.

(21) Appl. No.: 16/859,215

(22) Filed: Apr. 27, 2020

(65) Prior Publication Data

US 2021/0333245 A1 Oct. 28, 2021

(51) Int. Cl.
*B01D 53/02* (2006.01)
*G01N 30/10* (2006.01)
(Continued)

(52) U.S. Cl.
CPC .......... *G01N 30/10* (2013.01); *B01D 53/12* (2013.01); *B01D 2253/102* (2013.01); *B01D 2257/708* (2013.01); *B01D 2257/7022* (2013.01); *B01D 2257/7027* (2013.01); *B01D 2259/4508* (2013.01); *G01N 2030/025* (2013.01)

(58) Field of Classification Search
CPC ...... B01D 2253/102; B01D 2257/7022; B01D 2257/7027; B01D 2257/708; B01D 2257/91; B01D 2258/06; B01D 2259/4508; B01D 53/12; G01N 2030/025; G01N 30/10
See application file for complete search history.

(56) References Cited

U.S. PATENT DOCUMENTS 4,699,721 A 10/1987 Meenan et al.
5,509,362 A * 4/1996 Lyon .................. F23G 7/07
110/345

(Continued)

FOREIGN PATENT DOCUMENTS

CN 103364521 A 10/2013
CN 103453591 A 12/2013
WO 2008061320 A1 5/2008

OTHER PUBLICATIONS

International Search Report and Written Opinion for International Application No. PCT/US2021/070463, dated Aug. 25, 2021; pp. 1-15.
(Continued)

*Primary Examiner* — Christopher P Jones
(74) *Attorney, Agent, or Firm* — Bracewell LLP; Constance G. Rhebergen; Keith R. Derrington (57) ABSTRACT

Embodiments relate to systems and methods for fluidization in industrial hygiene applications. The method includes collecting air samples of contaminants onto the surface of fluidized activated carbon particulate as opposed to fixed-bed particulate. The adsorbates include toluene (a cyclic compound) and n-hexane (an open-chain compound). The obtained results are analyzed and discussed in terms of breakthrough times. The input parameters are the initial concentration of toluene or n-hexane in the air feed stream and the amount of the sorbent used. The feed flow rate is at 2 liters/min, and the temperature and humidity are kept constant at their prevailing laboratory conditions, i.e., 22±2° C. and 34±2% RH, respectively.

5 Claims, 12 Drawing Sheets

(51) Int. Cl.
*B01D 53/12* (2006.01)
*G01N 30/02* (2006.01)

(56) References Cited

U.S. PATENT DOCUMENTS

| | | |
|---|---|---|
| 5,511,409 A | 4/1996 | Knabel |
| 5,746,921 A | 5/1998 | Gargas et al. |
| 5,792,368 A | 8/1998 | Robertson |
| 5,879,567 A | 3/1999 | Robertson |
| 5,965,016 A | 10/1999 | Suchowski et al. |
| 6,143,187 A | 11/2000 | Robertson |
| 8,696,792 B2 | 4/2014 | Henningsen et al. |
| 9,272,931 B2 | 3/2016 | Robertson et al. |
| 2004/0031729 A1 | 2/2004 | Meier et al. |
| 2009/0011293 A1* | 1/2009 | Wood ............... C01B 3/583 |
| | | 429/479 |
| 2009/0145846 A1 | 6/2009 | Burns et al. |
| 2010/0221166 A1 | 9/2010 | Muggli |
| 2010/0273091 A1* | 10/2010 | Brey ............... B01J 23/688 |
| | | 429/513 |
| 2016/0082387 A1* | 3/2016 | Constantz ............... B01D 53/62 |
| | | 423/220 |
| 2016/0362321 A1 | 12/2016 | Robertson et al. |
| 2018/0333672 A1 | 11/2018 | Moulton et al. |
| 2019/0336952 A1* | 11/2019 | McGee ............... B01J 35/004 |

OTHER PUBLICATIONS

Kuo, H.P. et al.; "Continuous reduction of toluene vapours from the contaminated gas stream in a fluidised bed photoreactor" Powder Technology 195, 2009; pp. 50-56.

Park, Jae-Hyoung et al.; "Photodegredation of benzene, toluene, ethylbenzene and xylene by fluidized bed gaseous reactor with TiO2/SiO2 photocatalysts" Korean J. Chem. Eng., 28(8), 2011; pp. 1693-1697.

* cited by examiner

FLUIDIZED BED FOR INDUSTRIAL HYGIENE APPLICATIONS

TECHNICAL FIELD

Embodiments relate in general to systems and methods for air purification, and more specifically relate to fluidized beds for occupational hygiene applications.

BACKGROUND

Air pollution in the workplace or environment could be a problem. There are different methods and instruments that can be used to quantify air pollution. Selecting the type depends greatly on the properties of air contaminants and the purpose of the air pollutant quantification. The common active air sampling is carried out by collecting sample of air contaminants on filter media and the collected material can subsequently be analyzed using various preparation and analytical techniques.

Sampling for aerosols requires the employment of high flow rate pumps (e.g. about 2 liters/min). Meanwhile, sampling for gases or vapors uses low flow rate pumps (e.g. less than 500 ml/min). Conventional technology is effective at removing particles from the air, but to a far lesser extent breaking down air contaminants such as odors. To date, air purifiers have used a variety of filters, including electrostatic and high efficiency particulate air ("HEPA"), to remove particles from the air. In other air purifiers, the air is sterilized using ultra-violet irradiation. In yet other air purifying devices, contaminants are captured on solid support that contains a catalyst and in some cases absorbent material, such as carbon, and subsequently photocatalytically treated with ultra-violet irradiation.

Other undesirable air pollutants such as volatile organic compounds and microorganisms have contributed to the growing concerns about the health effects caused from indoor air pollution. Photocatalytic oxidation has been shown to oxidize effectively a wide variety of gas-phase volatile organic compounds at room temperature as well as kill microorganisms. However, because of their design, existing devices in the marketplace are able to remove or breakdown only limited amounts of volatile organic compounds and microorganisms. Two primary flaws of current devices are the limited amount of catalyst surface area and accessibility to a photocatalytic light source. Specifically, an effective photocatalytic oxidation reactor must irradiate efficiently the catalyst with ultraviolet light while achieving good contact between reactants and catalyst. The packed-bed reactor is not suitable for photocatalytic oxidation because light cannot penetrate into the interior of the bed. Thin-film reactors, which comprise the majority of the state-of-the-art reactor designs, use catalyst efficiently but may present diffusion limitation problems and their low catalyst loadings reduce adsorption capacities. This can be especially detrimental for indoor-air applications where organics at low concentrations adsorb to concentrate and then react, requiring more catalyst to increase adsorption capacities.

In general, it is known that fluidized bed reactors provide good mixing of reactant and catalyst, however due to particle composition limitations little work has been performed on developing a reliable air purifier using a fluidized bed.

SUMMARY

Accordingly, one embodiment of the present invention is a system for an industrial hygiene application. The system includes an air compressor configured to receive an air stream, a pressure regulator configured to regulate a pressure within the air stream, a precision rotameter configured to split the air stream into a first air stream and a second air stream, and to regulate a flow rate of the first air stream and the second air stream, a volatile organic compound (VOC) generator configured to receive the first air stream, wherein the volatile organic compound generator comprises a plurality of first metal bubblers, a humidity generator configured to receive a portion of the second air stream, wherein the humidity generator comprises a plurality of second metal bubblers, and a fluidized bed sampler for receiving a combination of the first air stream and the second air stream.

The fluidized bed sampler includes an activated charcoal sorbent medium utilizing a fluidized bed principle to sample volatile organic vapors using high flow rate pumps with the potential of combining the same arrangement with a particulate filter to simultaneously sample for aerosols. Such a dual sampler can prove very useful since it would eliminate the need for separate systems in case simultaneous sampling for organic vapors and particulate is required, therefore saving time and resources.

One embodiment is a method for collecting air samples of contaminants onto the surface of fluidized activated carbon particulate as opposed to fixed-bed particulate. The adsorbates include toluene (a cyclic compound) and n-hexane (an open-chain compound). The feed flow rate is maintained at about 2 liters/min. Further, the temperature and humidity are kept constant at laboratory conditions, e.g. 22±2° C. and 34±2% RH, respectively.

The method includes providing an air compressor for receive an air stream, providing a pressure regulator for regulate a pressure within the air stream, providing a precision rotameter for split the air stream into a first air stream and a second air stream, and to regulate a flow rate of the first air stream and the second air stream, providing a volatile organic compound (VOC) generator for receive the first air stream, wherein the volatile organic compound generator comprises a plurality of first metal bubblers, providing a humidity generator for receive a portion of the second air stream, wherein the humidity generator comprises a plurality of second metal bubblers, and providing a fluidized bed sampler for receiving a combination of the first air stream and the second air stream.

BRIEF DESCRIPTION OF THE DRAWINGS

All aspects and features of certain example embodiments of the present disclosure will be more apparent from the following description taken in conjunction with the accompanying drawings, in which.

DETAILED DESCRIPTION

The particulars shown here are by way of example and for purposes of illustrative discussion of the examples of the subject disclosure only, and are presented in the cause of providing what is believed to be the most useful and readily understood description of the principles and conceptual aspects of the subject disclosure. In this regard, no attempt is made to show more detail than is necessary, the description taken with the drawings making apparent to those skilled in the art how the several forms of the subject disclosure may be embodied in practice. Furthermore, like reference numbers and designations in the various drawings indicate like elements.

Embodiments disclosed herein use a fluidization principle in industrial hygiene applications to achieve rapid and efficient sampling of air and gases. Systems and methods disclosed enable collection of contaminants from air samples onto the surface of fluidized activated carbon particulate as opposed to fixed-bed particulate. The system includes charcoal sorbent material and adsorbates, namely, toluene (a cyclic compound) and n-hexane (an open-chain compound).

The example method disclosed has many advantages over the conventional fixed bed samplers, which are problematic because they take a very long time to saturate the bed and obtain breakthrough. Fluidized bed utilizes much smaller mass of adsorbent, and therefore it requires much less time to saturate and breakthrough. Although embodiments disclosed here include a charcoal sorbent as an example, the sampling instrument can utilize any type of sorbent as long as it can be carried by the air stream.

Figure 1:
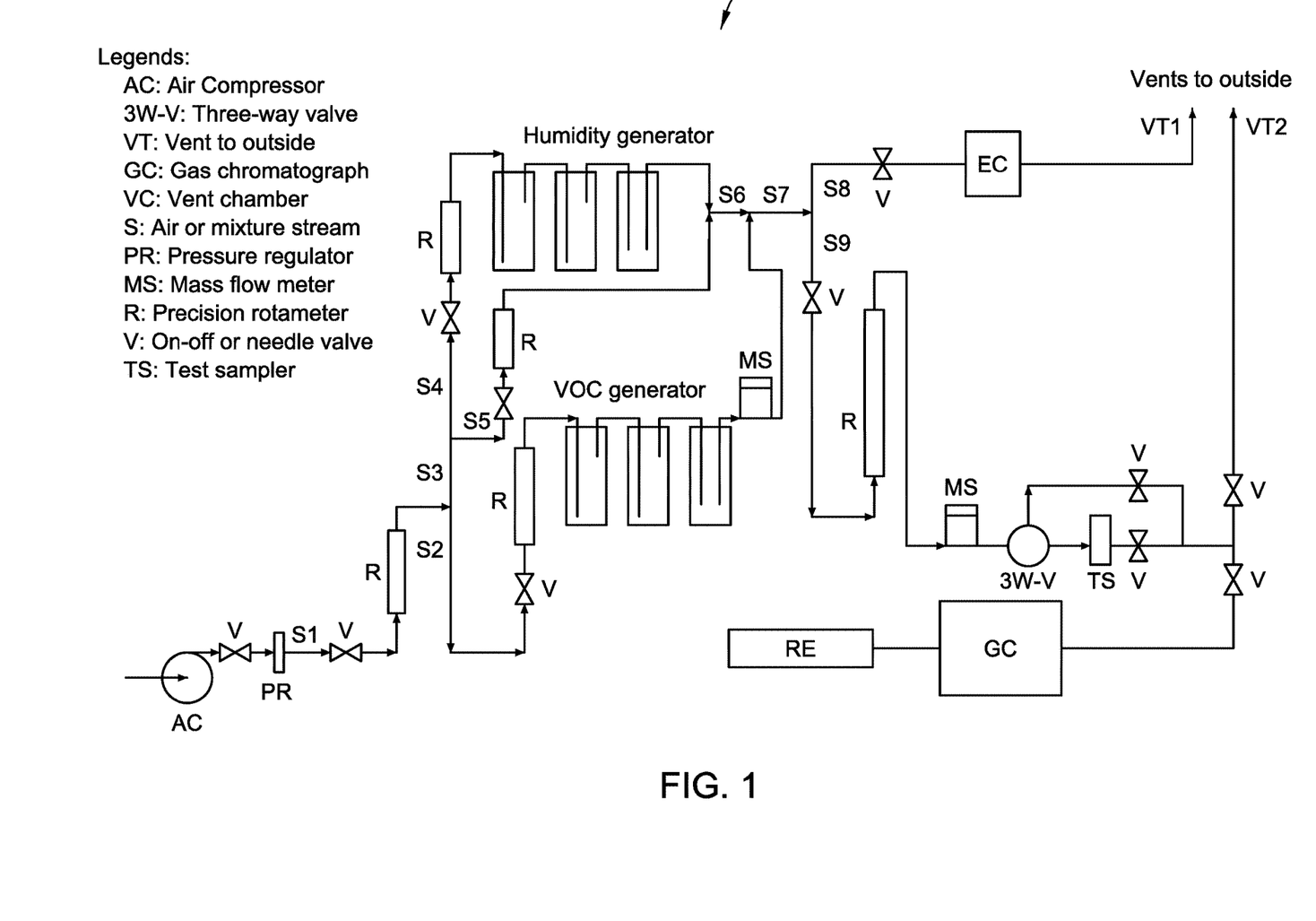
FIG. 1 is a schematic of a system based on a fluidized bed principle for an industrial hygiene application, according to one embodiment of the disclosure.

FIG. 1 is a schematic of a system 100 based on a fluidized bed principle for an industrial hygiene application, according to one embodiment of the disclosure. In system 100, AC is the air compressor, 3W-V stands for a three-way valve, VT stands for vent to outside, GC stands for a gas chromatograph, VC is a vent chamber, S stands for air or a mixture stream, PR is a pressure regulator, MS is a mass flow meter, R is a precision rotameter, V is an on-off needle valve, and TS is the test sampler.

A dynamic experimental set-up is devised to study the validation of the fluidized bed charcoal media in comparison to the standard conventional sampling method. This required preparation of a dynamic known concentration of a given adsorbate, monitoring concentration of air-adsorbate mixture before and after passing through the sampler (fluidized bed) for composition by means of the on-line calibrated GC. The system 100 illustrated in FIG. 1 may be divided into four functionally discrete segments. The first segment deals with the preparation of the feed or input vapor stream. The second segment deals with the sampler assembly (e.g. the fluidized bed). The third segment deals with the control of temperature and humidity, and the forth segment deals with the analysis of the feed or input vapor stream exiting from the sampler assembly.

Two materials, namely, toluene and n-hexane, both of which are non-polar organic compounds, are selected because their compositional structure differed. Toluene is an aromatic compound and n-hexane is a straight-chained compound. The system 100 is devised in order to fulfill the following objectives: preparation of a dynamic known concentration of a given adsorbate to examine whether this difference influenced adsorption, particularly into the micropores of porous sorbents; conduct a series of tests at given sets of experimental conditions; sampling and analyzing the air-adsorbate mixture before and after passing through the sampler for composition by means of the on-line calibrated GC.

Figure 2A:
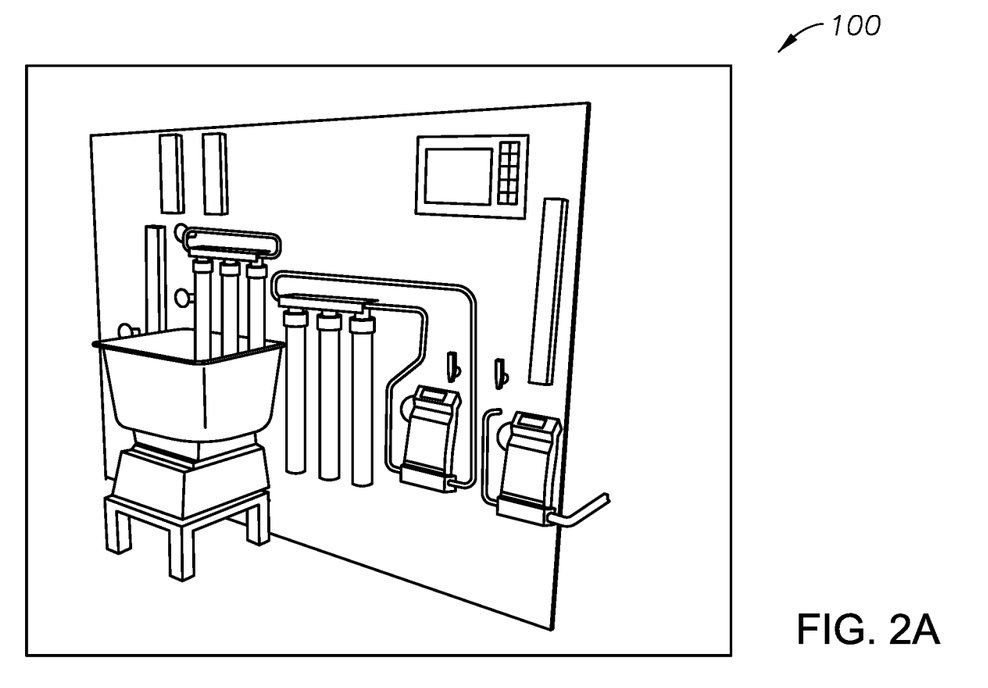
FIGS. 2A and 2B are photographs of a system based on a fluidized bed principle for an industrial hygiene application, according to one embodiment of the disclosure.
Figure 2B:
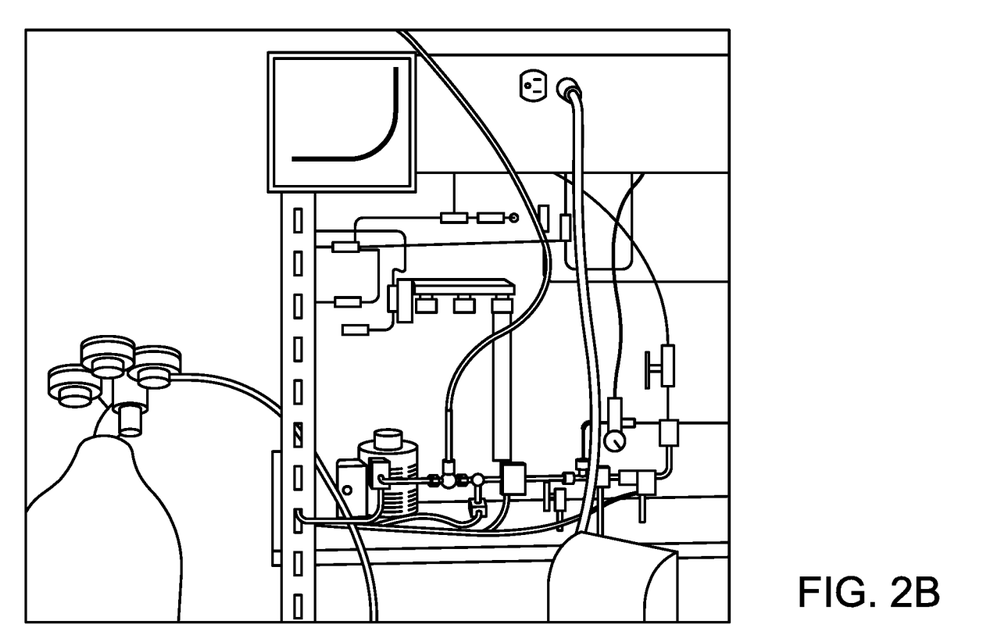

FIGS. 2A and 2B are photographs of the system 100 shown in FIG. 1. The system 100 illustrated in FIG. 2 may be divided into four functionally discrete segments. The first segment deals with the preparation of the feed or input vapor stream. The second segment deals with the sampler assembly (e.g. the fluidized bed). The third segment deals with the control of temperature and humidity, and the forth segment deals with the analysis of the feed or input vapor stream exiting from the sampler assembly.

In order to avoid catalytic effects during the experiments, the experimental set-up is constructed primarily with stainless steel tubing (small sections containing Tygon® or plastic tubing) and borosilicate glass, which are known for their inertness to react with organic compounds, particularly at normal ambient temperatures. A liquid soap leak detector is used to test for leakage where connections are made.

The vapor feed stream is composed of an adsorbate (an organic solvent or a volatile organic compound (VOC)) in a dilute mixture with air. Both toluene and n-hexane are provided in liquid state from Fisher Scientific with greater than 99.8% essay quality. The air source is the laboratory central air supply system, where ambient atmospheric air is compressed by means of air compressors, purified by passing through activated carbon filters and dried by forcing it through desiccators of anhydrous calcium sulfate. The air stream used throughout the experiments is provided from this system through a pressure regulator (Norgren® type). Further, the chromatographic analysis of representative samples of the product air indicated that no foreign materials existed in significant amounts, and therefore, it is employed without further purification.

The system is used to produce a dynamic, constant, and known concentration of the feed mixture. In the VOC injection (generation) system a new technique is used to generate constant VOC at experimental conditions. The system is simple and easy to operate, where the required adsorbate concentration and humidity level in the feed air stream are obtained by adjusting the relevant operational rotameters. Generally, the system 100 includes a main rotameter (e.g. Allegro® industries), two sets of three metal bubbler columns (e.g. Agilent® type) to generate water vapor and VOC, two rotameters (e.g. Bailey Fischer Porter serial no. 98W-007060 and 97W-051645) to regulate air streams, two sets of mass flow meters (e.g. Model GFM17) and two sets of rotameters with needle valve (e.g. Cole Pramer®, serial nos. 62004-1 and 191344-2) and a digital humidity and temperature recorder (e.g. EXTECH® Model RH520). The system components can be interconnected with quarter inch stainless steel pipes.

A feed mixture of a given VOC with air is prepared by placing 100 ml of distilled water in each of the first two bubblers (first set) which are immersed in a thermal bath to control the temperature and thus the vapor pressure of the water. The third bubbler is empty and used to trap any condensed amounts of water vapor. 50 ml of a given VOC is then placed in the first bubbler of the second set. The second and third bubblers are empty and used to trap any condensed amounts of the VOC vapor. An air stream (S1 liters per minute) of clean, dried air stream is allowed to flow in by means of adjusting the local pressure regulator. The air stream S1 is divided into two streams S2 and S3 where stream S2 is passed through the VOC bubblers and stream S3 is further branched into two sub-streams S4 and S5. Sub-stream S4 is passed through a set of three bubblers; the first two of which contain 100 ml of distilled water. The inlet tip of this sub-stream is located above the water surface so as to avoid direct contact with the water and subsequently to limit saturation. The third bubbler in the set is used to trap any condensed water vapor.

Sub-stream S4 is then made to combine with sub-stream S5 to form stream S6. This arrangement is used to obtain the required values of the relative humidity in the feed mixture. Stream S2 is passed through three bubblers and the first one contains 50 ml of the VOC. Streams S2 and S6 are recombined to form one stream (stream S7), which is divided again into streams; vented stream S8 and feed stream S9. By manipulating the respective two controlling valves, it is possible to adjust and maintain the flow rate of feed stream S9 at the required value. Stream S8 or the excess air flow rate is vented to the outside atmosphere through vent VT1. The temperature and relative humidity of streams S8 and S9 are monitored using digital humidity and temperature recorder (e.g. EXTECH® Model RH520). It should be noted that flow rates of all streams are closely controlled by precise flow rotameters. However, stream S2 (out of the VOC bubblers) and feed stream S9 are further monitored by mass flow meters that ensured constant flow rates during the experimental runs. It should be noted here that in FIG. 1, EC is an exhaust chamber that may be used to remove any excess humidity that may be present in stream S8, and RE is a recorder that is used to determine the concentration of VOC in the stream S9, which is fed to the GC.

Feed stream S9 is then made to pass through a 3-way valve which is manipulated to direct the mixture either through or by-pass the sampler assembly or into venting line VT2. Frequent samples of the effluent stream from the sampler are diverted to the GC for monitoring through 6-way sampling loop. Excess of the effluent stream is allowed to be vented also through venting line VT2. The flow rate of the output of exit stream (i.e., stream S9) either from or by-passing the sampler is further checked by means of SKC dryCell calibrator (model DCL-M serial no. 110243).

Figure 3:
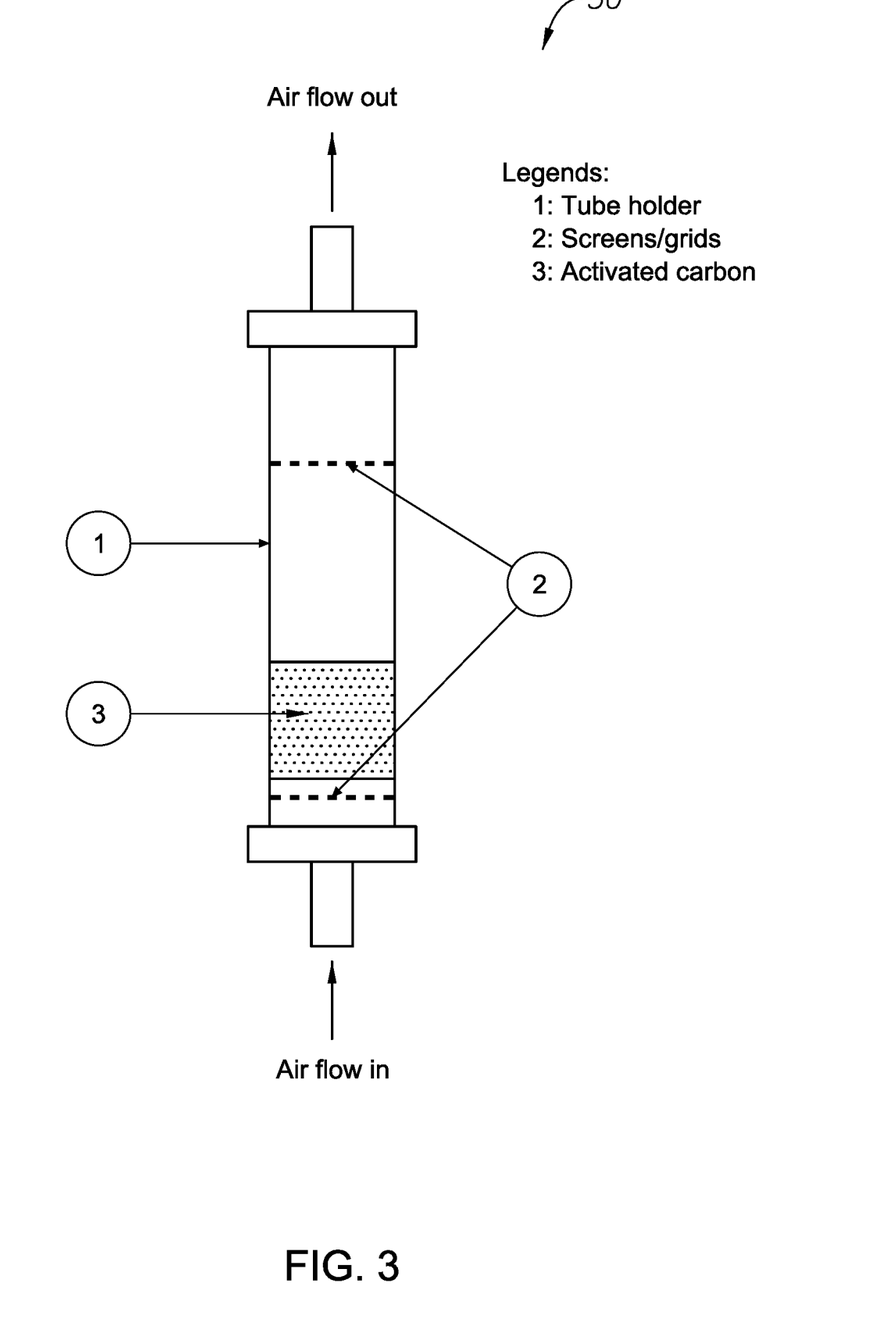
FIG. 3 illustrates a mobilized and expanded adsorbent bed sampler for use in a system based on a fluidized bed principle for an industrial hygiene application, according to one embodiment of the disclosure.

FIG. 3 illustrates a mobilized and expanded adsorbent bed sampler 50 for use in a system based on a fluidized bed principle for an industrial hygiene application, according to one embodiment of the disclosure. The sample collection device or simply the sampler 50 includes a tube holder (1) that is normally used to house single sorbent tubes. The internal diameter of the holder (1) is measured by a sensitive electronic caliper (e.g. Model CD-4"CX), and approximately equal to 9.86±0.02 mm. The holder (1) is fitted at the bottom and top with 48-mesh stainless steel screens or grids (2) (supplied by e.g. W. S. Tyler, Inc. of OH, USA). This mesh scale is equivalent to 300 µm openings, and is therefore suitable to retain JK50 particulate since the mean diameter of the latter is 539 µm. The objective of the bottom grid (2) is to provide uniform distribution of air into the fluidized bed, and thus stable fluidization, and to furnish the floor which supported the weight of the bed. On the other hand, the purpose on the upper screen or grid (2) is to prevent or minimize the loss of the sorbent particulate entrained in the effluent air stream from the sampler. By weighing the content of the bed before and after each run, one is able to quantify the loss of sorbent material.

Figure 4:
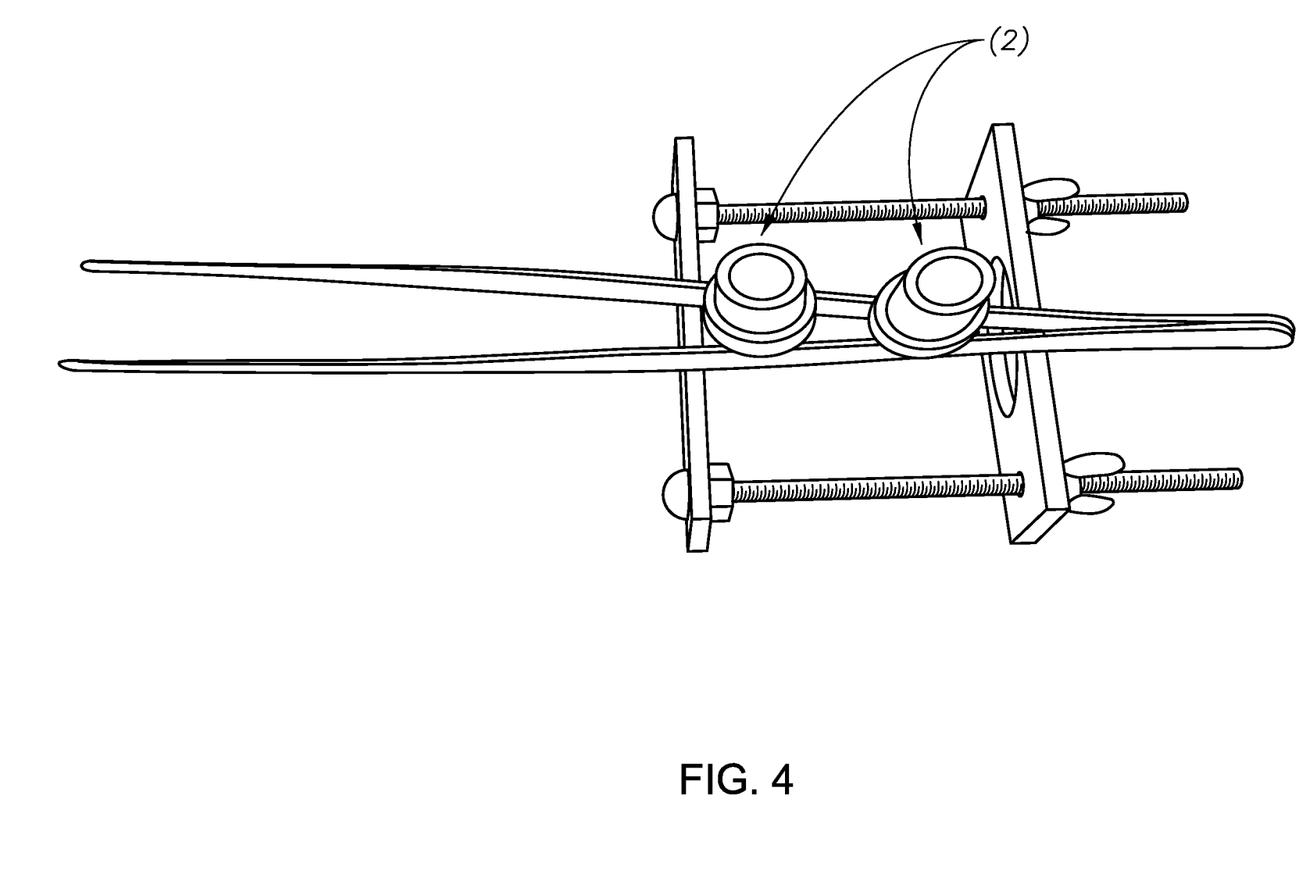
FIG. 4 is a photograph of the bottom and top mesh in a system based on a fluidized bed principle for an industrial hygiene application, according to one embodiment of the disclosure.

FIG. 4 is a photograph of the bottom and top mesh (2) in a system based on a fluidized bed principle for an industrial hygiene application, according to one embodiment of the disclosure. The measured diameter of the mesh or grid is 5.42 mm. For a 48-mesh screen, the effective area of the current grid is estimated in the range of 9-12 mm$^2$.

The sorbent medium is the activated carbon (3), which is placed into pre-weighted Teflon plates. The required amount of this carbon is then weighted using a sensitive, electronic balance (e.g. Metler Toledo® Model AT261 Delta Range), and then transferred into the filter holder. The bed loading is accurately determined by weighing the holder (or sampler) before and after loading it with the carbon, and the difference constituted the bed loading. Three values for the bed loading are used, namely, 300, 400 and 500 mg.

A set of pressure drop measurements is conducted across the sampler 50 as a function of loading and flow rate of air. In other words, the values measured include the pressure drop due to the entire setup plus the bed loading. For instance, the pressure drop due to the bottom grid before and after bed loading is known to differ significantly. The resistance of the grids without the bed is significantly less than their resistance with the bed at comparable flow rate. Thus, the sampler is weighed before and after it is charged with particulate activated carbon by means of a sensitive electronic balance. The difference determines the weight. After the sampler 50 in the upright position the pressure drop is measured by means of digital manometer. The manometer is tapped into the sampler by means of two openings, one before and one after the sampler via T-connectors. Then, an accurately measured flow rate of dry air stream is passed through the sampler and the pressure drop is recorded of the manometer. The air flow rate is measured at the exit into the atmosphere by an electronic digital flow meter. The method is repeated with several values of air flow rate from 0.5 to 5.0 liters/min, and three values of the bed loading namely, 300, 400 and 500 mg, are measured. Breakthrough adsorption experiments are performed according to the parameters shown in Table 1.

TABLE 1

Breakthrough Experimental conditions

| Parameter | Values |
|---|---|
| Adsorbates | Toluene and n-hexane |
| Weight of sorbent | 300, 400, and 500 mg |

TABLE 1-continued

Breakthrough Experimental conditions

| Parameter | Values |
|---|---|
| $C_i$ (toluene) | 25 and 100 ppm |
| $C_i$ (n-hexane) | 100 ppm |
| Flow rate | 2 liters/min |
| Temperature and RH | Ambient conditions (22 ± 2° C. and 34 ± 2%) |

Figure 5:
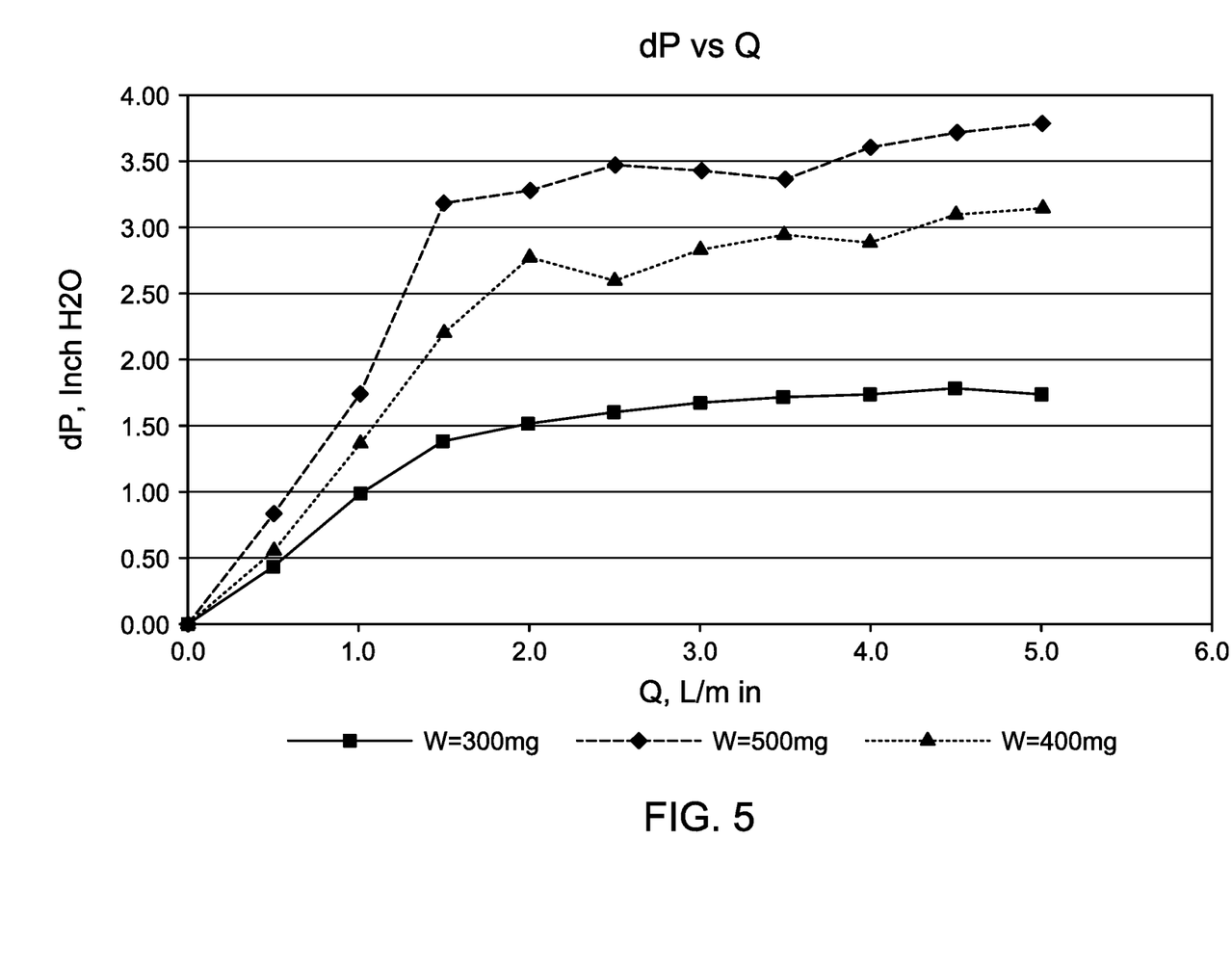
FIG. 5 is a graph illustrating pressure drop (dP) at different flow rates (Q), according to one embodiment of the disclosure.

FIG. 5 is a graph illustrating pressure drop (dP) at different flow rates (Q), according to one embodiment of the disclosure. During pressure drop measurements, the bed behavior is visually observed. Apart from bed loading, the bed experienced at low flow rates (up to 1.0 liters/minute) some degree of mixing, which is mainly homogeneous, but remained in a fixed state. As the flow rate increased (greater than 1.0 liters/min), bubbles are formed, particle mixing became intense, the bed started to expand, surface layer slightly floated and some particles rose from the surface and fell back onto it in circular manner. At flow rates greater than 1.5 liters/min, aggregates of the activated particles are observed to rise upwardly in jet-like streams or what may be classified as "slugging fluidization". At flow rates greater than 3.0 liters/min, particles are observed reaching the upper grid of the sampler. At the flow rate of interest (i.e., 2 liters/min), the minimum and maximum of heights ($H_f$) of particulate aggregates are visually estimated and recorded during each experimental run, and the average of the two values is then used to estimate the bed voidage using Equation 1. The pressure drop of the sampler arrangement during bed fluidization or expansion is shown in FIG. 5 as a function of air flow rate and bed loading. In this figure, the flow rate is represented by the x-axis and the pressure drop by the y-axis.

As expected, the pressure drop increased with the increase in flow rate of the air stream. The results shown in FIG. 5 suggest that the bed is nearly fluidized. Examining the lower part of each curve, the pressure drop is noted to increase proportionally with the flow rate of the air stream. The upper part of each curve seemed to have leveled off implying constant pressure drop regardless of the respective increase in flow rate or gas velocity.

FIG. 5 indicates that the pressure drop across the bed at that flow rate is equal to about 1.50, 2.75, and 3.30 inch water for bed loading of 300, 400, and 500 mg, respectively. There are several parameters that result in complete or partially fluidization. These could include the sampler holder diameter and height, ratio of height to diameter, and opening size of the bottom grid. Moreover, the location of the bottom grid with respect to height of the tube holder may also another parameter that defines how sharp the air feed stream entered the sampler. Bearing the above in mind, the bed is nevertheless considered nearly or completely-fluidized under the present conditions and the results and related conclusions are interpreted based on this consideration.

The degree of fluidization, voidage, or expansion ratio may be estimated using Equation 1:

$$v_b = \frac{H_f - H_s}{H_f} \quad \text{(Equation 1)}$$

where $H_f$ is the average height of the fluidized bed at a given flow rate, $H_s$ the height of the static bed when flow rate Q is zero, and $V_b$ the bed voidage.

Table 2 below shows the bed expansion at a flow rate (Q) of 2 liters/min and the three loadings tested in the breakthrough experiments, namely, 300, 400, and 500 mg. Due to the instability of the bed under the conditions attempted, an approximate range of $H_f$ is estimated.

TABLE 2

Bed-expansion as function of bed loading and air flow rate

| Q, liters/min | Bed loading, mg | ΔP, inch water | $H_s$, mm | $\rho_{bs}$, g/ml | $H_f$, mm | Expansion ratio $v_b$ $\left(\frac{H_f - H_s}{H_f}\right)$ | $\rho_{bf}$, g/ml |
|---|---|---|---|---|---|---|---|
| 2 | 300 | 1.50 | 8.1 | 0.49 | 14.0-19.0 | 0.51 | 0.24 |
| 2 | 400 | 2.75 | 10.1 | 0.52 | 16.5-21.5 | 0.45 | 0.28 |
| 2 | 500 | 3.30 | 12.2 | 0.54 | 20.0-22.5 | 0.42 | 0.31 |

As seen above in Table 2, the bed expansion is about 42 to 51% at the conditions attempted of the bed mass and feed flow rate. The last column of Table 2 also lists the estimated bulk density ($\rho_{bf}$) at the respective conditions of bed loading and air flow rate. These values are calculated using Equation 2:

$$\rho_{bf} = (1 - v_b)\rho_{bs} \quad \text{(Equation 2)}$$

where $\rho_{bs}$ is the bulk density of activated carbon in the sampler at no flow conditions (i.e, Q=0).

Figure 6:
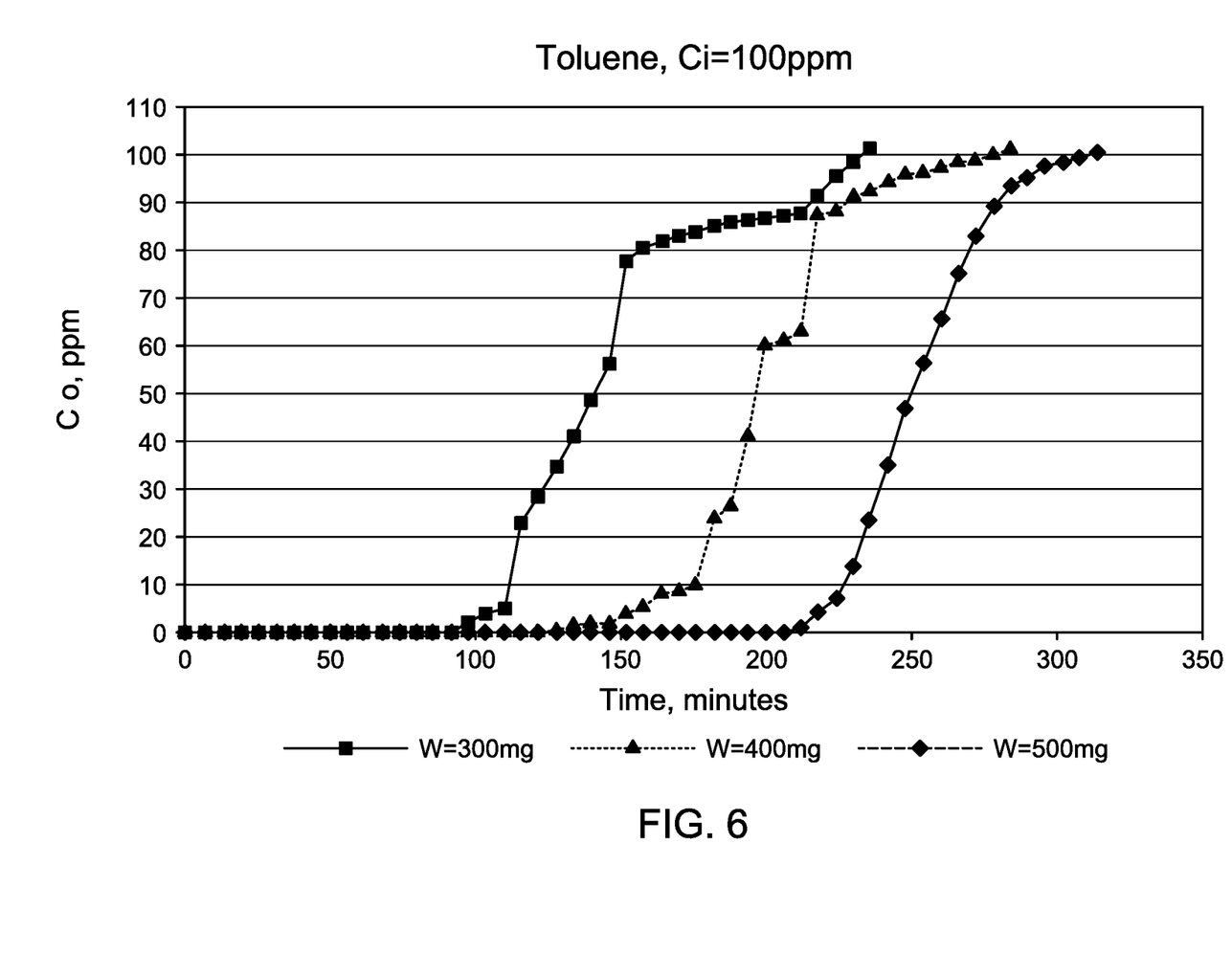
FIG. 6 is a graph illustrating full breakthrough time for toluene at different weights at Ci=100 ppm, according to one embodiment of the disclosure.

FIG. 6 shows the breakthrough curves (BTC) for toluene and n-hexane, respectively, at the three loadings of the expanded bed tested. The current breakthrough experiments are conducted at a feed flow rate of 2 liters/min, i.e., in the region of high flow rate sampling. These results are obtained while the concentration of the two adsorbates is kept at 100 ppm and flow rate at 2 liters/min. In addition, the temperature and humidity remained at their ambient values. The results did not produce smooth curves as it is the case of fixed-bed samplers. This phenomenon is quite common with using fluidized beds, where they are known for the instability and erratic behavior, particularly at velocity greater than the minimum fluidized velocity.

As seen in FIG. 6, the results of breakthrough experiments produced s-shape curves that normally characterize adsorption phenomenon. However, the breakthrough curves in the fluidized bed are sharper implying that strong mixing of the fluidized solid phase could result in more efficient analyte adsorption. This could be explained by the ability of fluidized beds to process large volumes of fluid. The experimental results also indicated that the 5% breakthrough time for toluene ranged from 100 minute for 300-mg to more than 200 minutes for 500-mg fluidized bed when the initial concentration of toluene in the feed is 100 ppm.

When these results are compared to those obtained in the case of the fixed-bed, one can observe that the 5% breakthrough time of the fluidized bed is greater than for the fixed-bed arrangement. For instance, a 2-layer fixed-bed (i.e., ~860 mg) allowed a feed with 100 ppm toluene concentration only about 180 minutes before the 5% concentration breakthrough occurred. Under the same conditions of $C_i$ (100 ppm) and flow rate (2.0 liters/min) and ambient conditions of temperature and humidity, the 5% breakthrough time for the 500-mg expanded bed is about 220 minutes. In other words, it took the fluidized bed longer residence time to achieve the same breakthrough of 5%. Of a fixed-bed sampler which had about 70% more mass of activated carbon.

Figure 7:
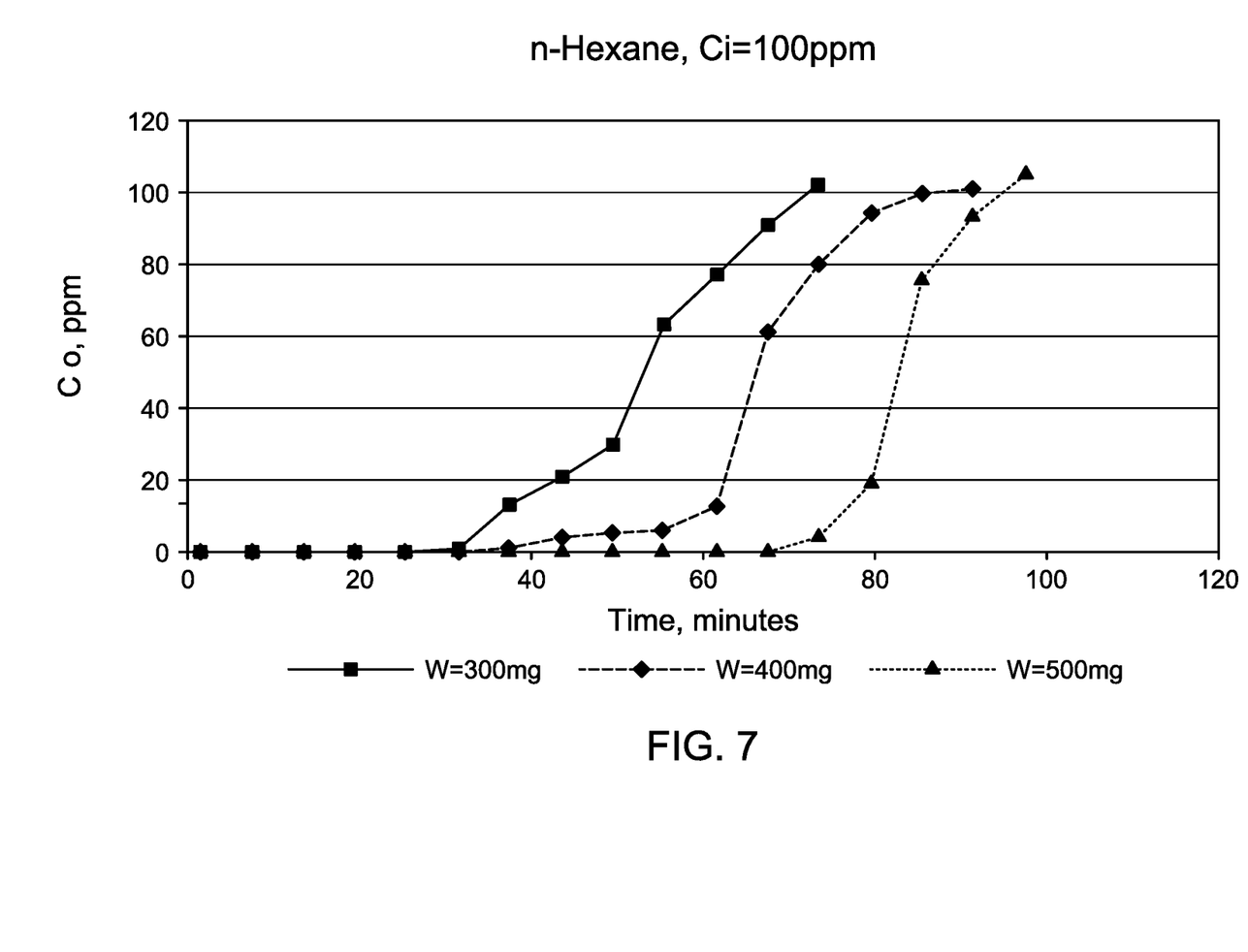
FIG. 7 is a graph illustrating full breakthrough time for n-Hexane at different weights at Ci=100 ppm, according to one embodiment of the disclosure.

The same figures also show the effect of the fluidized-bed weight or loading on the adsorption of toluene and n-hexane. The results indicate there is a direct dependency of the breakthrough times on the fluidized-bed weight. This is not unexpected since more weight of the sorbent has more active adsorption sites.

Similar results are also obtained for n-hexane. The results of FIG. 7 indicate that the 5% breakthrough time for 100 ppm feed could range from 30 to 70 minutes for 300 and 500-mg bed loading, respectively when the initial concentration in the feed is 100 ppm. However, these values of breakthrough time are much lower than their counterparts in the case of toluene. Also, a comparison between the current results and those obtained with fixed-bed implies that the 5% breakthrough times of the fluidized bed are still greater than those for the fixed-bed arrangement. For instance, a 2-layer fixed bed (i.e., about 860 mg of activated carbon) allowed only for about 60 minutes before the 5% breakthrough is reached. At the same conditions of $C_i$ (100 ppm) and flow rate (2 Liters/min), with the 500-mg expanded bed, the 5% breakthrough time is 70 minutes, i.e., about the same, but with less mass of activated carbon.

The results indicated that the direct dependency of the breakthrough times on the fluidized-bed weight increased. This is not unexpected since more mass of the sorbent have more active sites or micropores that are available for adsorption.

Figure 8:
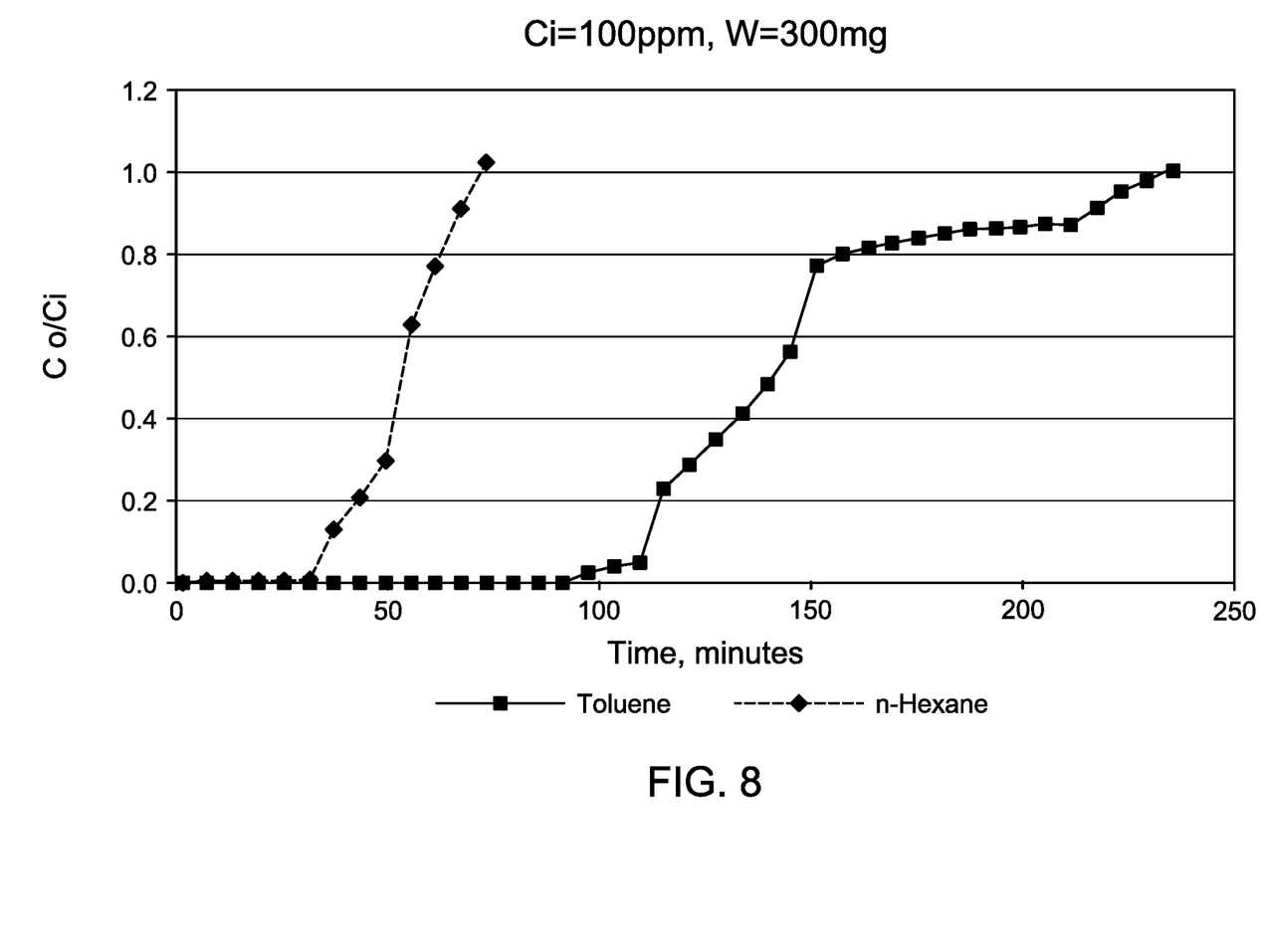
FIG. 8 is a graph is a graph comparing full breakthrough time for toluene and n-Hexane at 300 mg, according to one embodiment of the disclosure.
Figure 9:
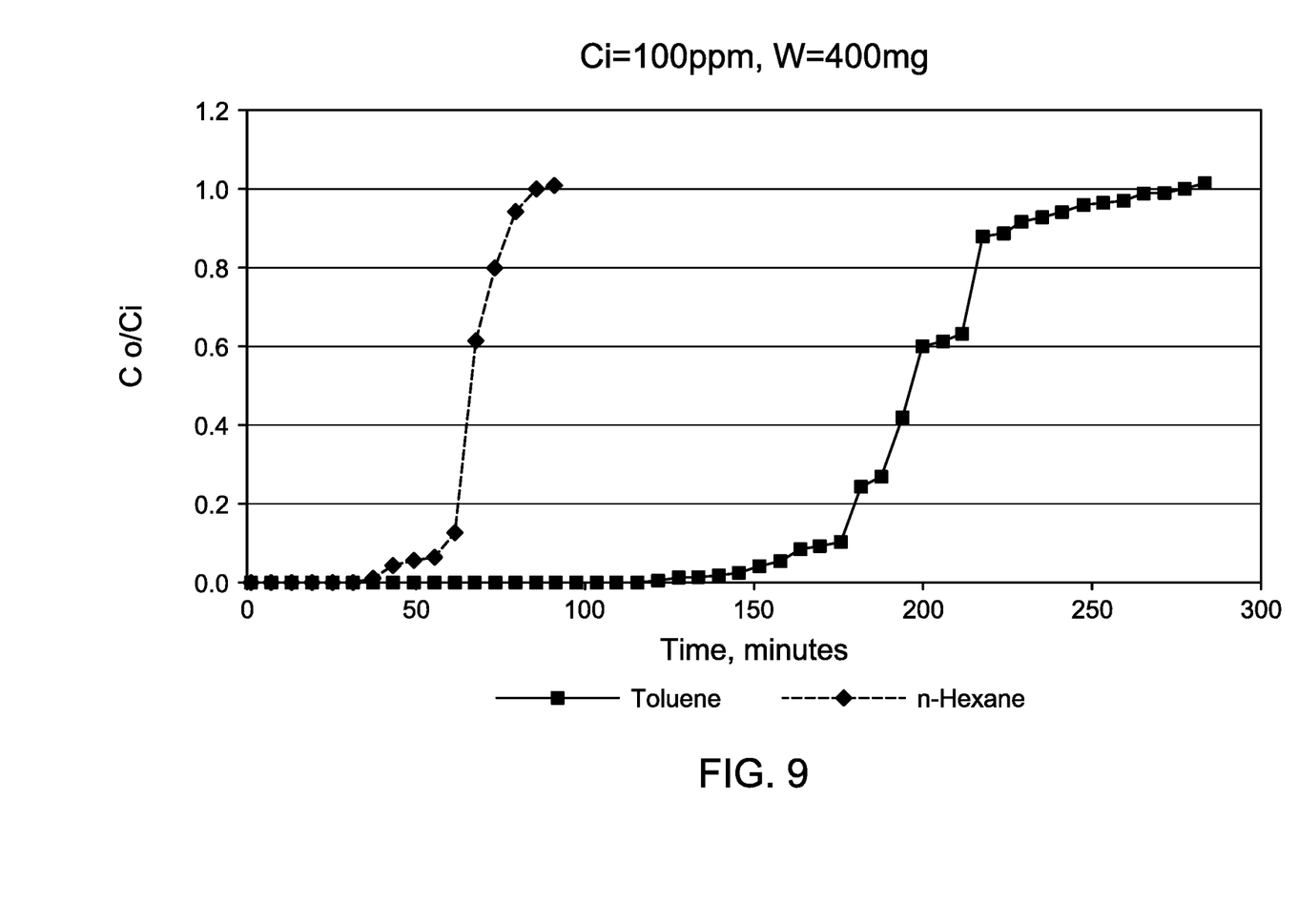
FIG. 9 is a graph is a graph comparing full breakthrough time for toluene and n-Hexane at 400 mg, according to one embodiment of the disclosure.
Figure 10:
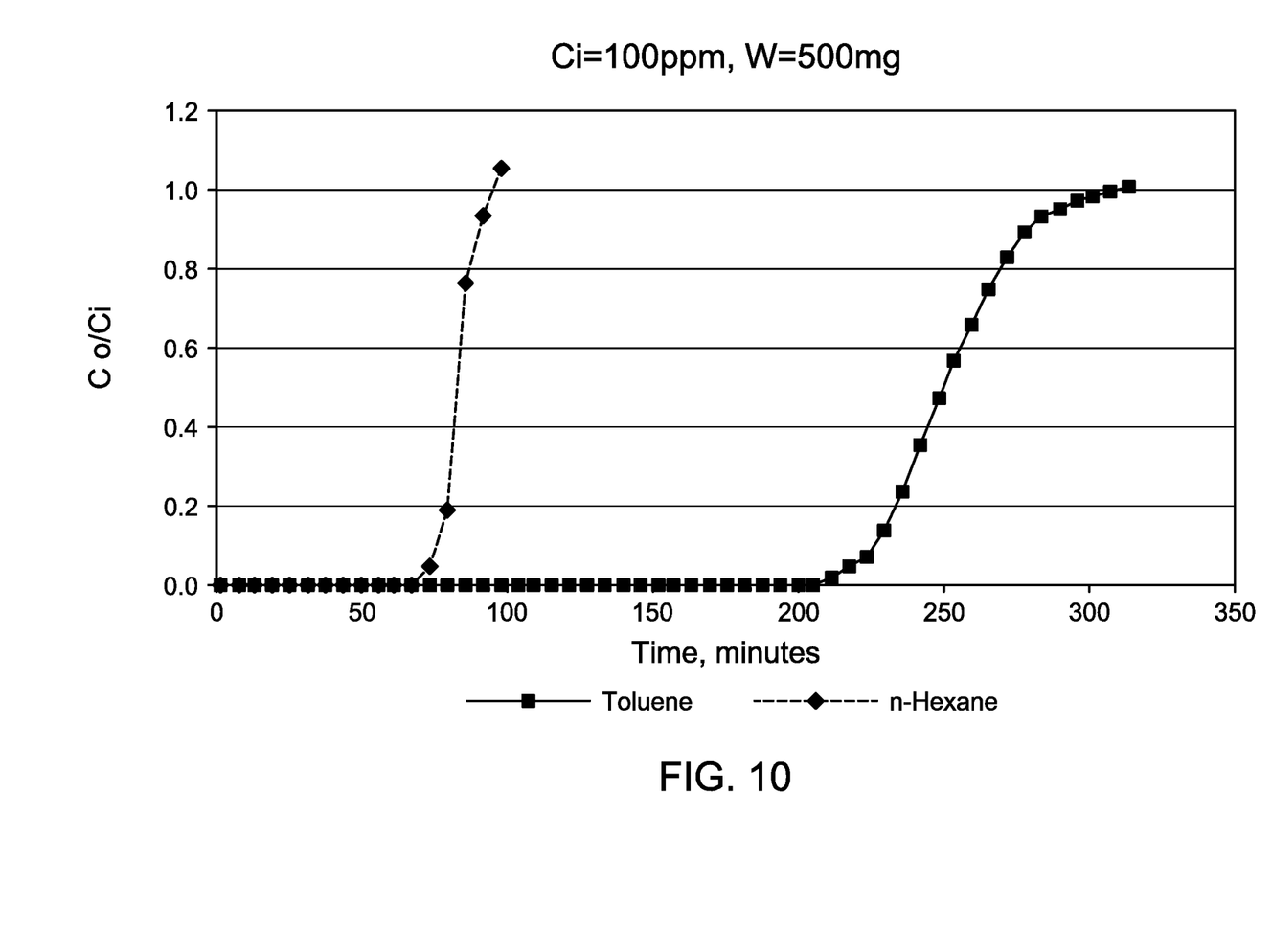
FIG. 10 is a graph is a graph comparing full breakthrough time for toluene and n-Hexane at 500 mg, according to one embodiment of the disclosure.

FIGS. 8-10 show breakthrough curves (BTC) for both toluene and n-hexane combined for a side-by-side comparison. The results of each of these figures are obtained for a given bed loading and otherwise constant conditions of Q (2 liters/minute), $C_i$, (100 ppm), temperature (22° C.) and relative humidity (34%).

In general, the results indicate that breakthrough times for toluene are several folds longer than those of n-hexane, particularly at high values of the feed initial concentration. However, there is a greater affinity of activated carbons for less volatile materials such as toluene ($p_v$=24 mm Hg at 22° C.) when it is compared to n-hexane ($p_v$=126 mm Hg at 22° C.). Further, the likelihood of entrapment of open, long chain compounds, e.g., n-hexane in the active sites of the carbon is less than that of branched, cyclic or ring compounds, e.g., toluene. In other words, the active sites of the sorbent can be more restricted for open-chain compounds such as n-hexane.

It is also shown that the length and linearity of the hydrocarbon chain and the presence of instauration in the structure, and the presence of aromatic ring type of functionality and size are also determinant factors in the adsorption of aromatic compounds. Further, the nature of activated carbons can play additional role. Impurities contained in activated carbons are prone to have greater affinity attract towards cyclic compounds (e.g., toluene) than towards straight chained compounds (e.g., n-hexane).

Figure 11:
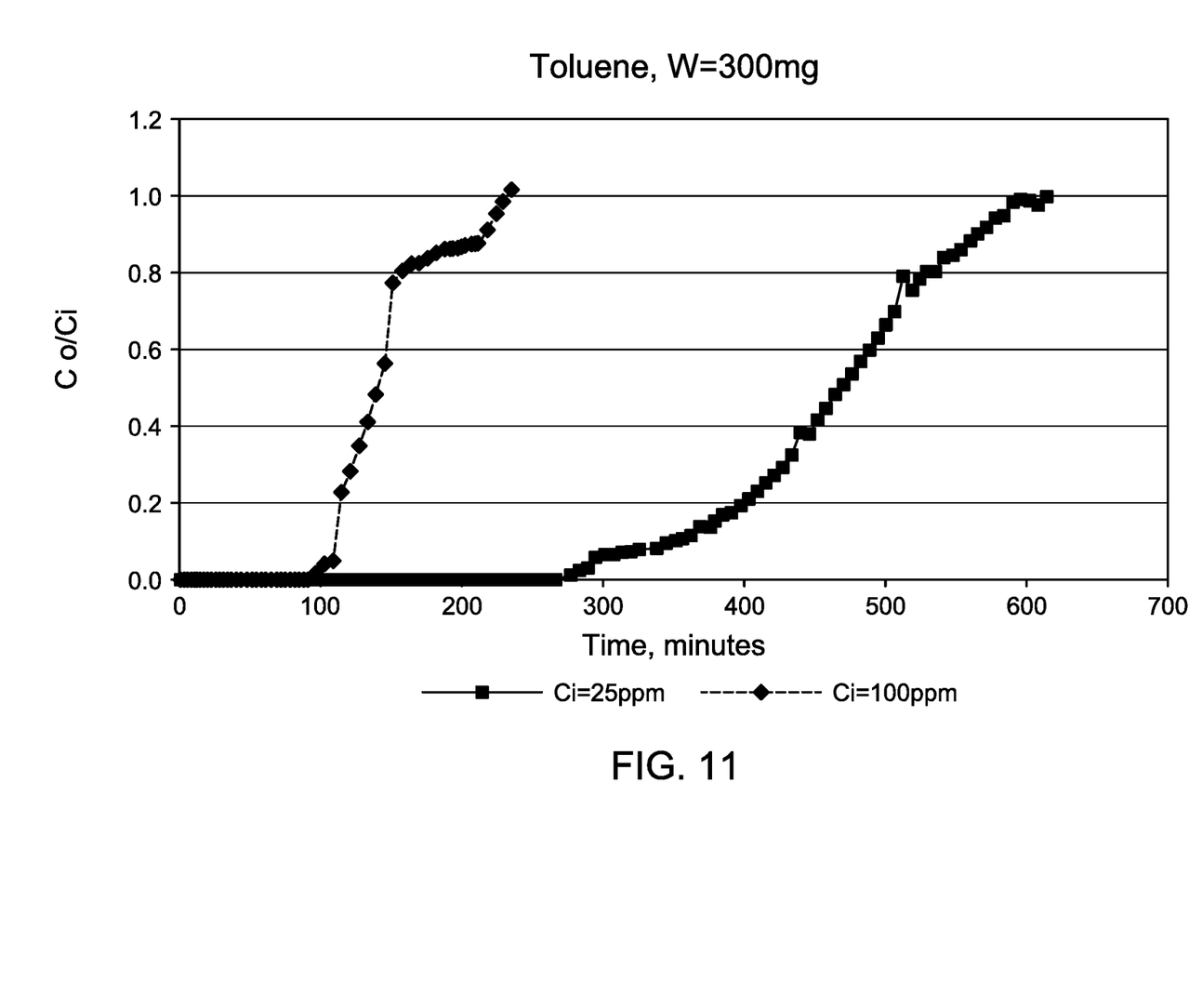
FIG. 11 is a graph illustrating the effect of concentration on full breakthrough time for toluene at 300 mg, according to one embodiment of the disclosure.
Figure 12:
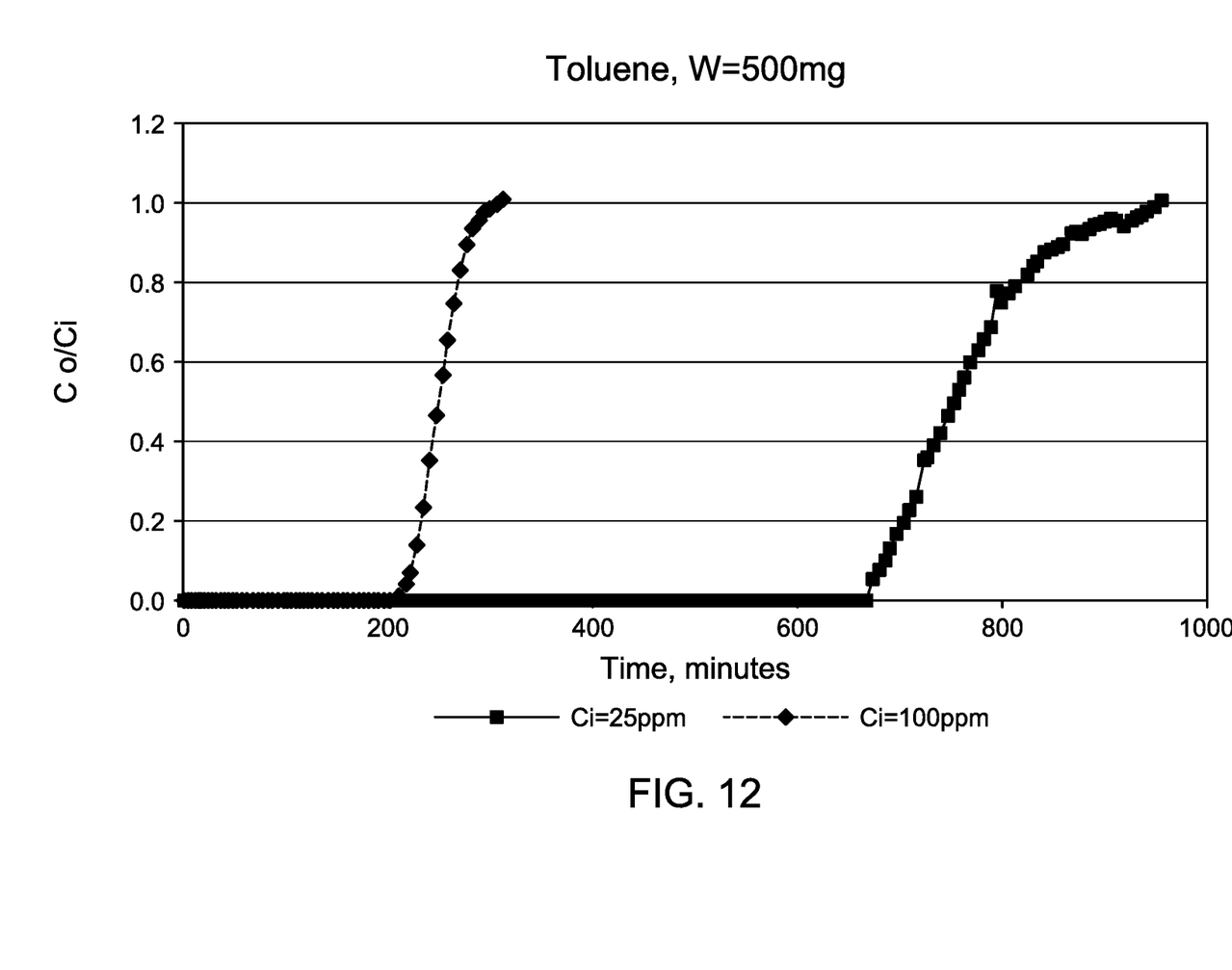
FIG. 12 is a graph illustrating the effect of concentration on full breakthrough time for toluene at 300 mg, according to one embodiment of the disclosure.

The dependency of the breakthrough time on the initial concentration of the adsorbate is investigated for toluene. This is done by conducting breakthrough experiments at an additional value for $C_i$, namely, 25 ppm. FIGS. 11 and 12 show the side-by-side results of the two initial concentrations at two bed-loadings; 300 and 500 mg. The x-axis represents the residence time while the y-axis represents the breakthrough concentration in dimensionless form. The breakthrough time is shown to be inversely proportional to the initial concentration. As discussed earlier, these results are not unexpected since high-concentration feed have more adsorbate mass that can be adsorbed or saturate the available active sites for adsorption of the sorbent material, and hence faster breakthrough. These results are also consistent with the theoretical considerations of the adsorption theory which predict that less solvent is adsorbed at lower concentrations.

Fluidization is known for its high efficiency of mass transfer and the ability of process high volumes of air. Therefore, it could be a viable method to collect sizable samples of contaminants in the work environment. Toluene, a cyclic substance and n-hexane, open-chained substance can be used as the sole adsorbates. Based on the results obtained, the following conclusions can made: adsorption breakthrough curves in fluidized beds follow the usual S-shape curves obtained in the case of fixed or stationary bed. However, the curves are steeper (closer to the J-shape) indicating higher efficiency of adsorption rate. This is also confirmed from the much higher values for the adsorption rate constant for the expanded beds. Under the same conditions of sorbent mass, feed concentration of toluene or n-hexane, adsorbate flow rate, temperature the fluidized bed exhibited greater adsorption capacity particularly for toluene.

The Specification, which includes the Summary, Brief Description of the Drawings and the Detailed Description, and the appended Claims refer to particular features (including process or method steps) of the disclosure. Those of skill in the art understand that the invention includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a," "an," and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. The verb "couple" and its conjugated forms means to complete any type of required junction, including electrical, mechanical or fluid, to form a singular object from two or more previously non-joined objects. If a first device couples to a second device, the connection can occur either directly or through a common connector. "Optionally" and its various forms means that the subsequently described event or circumstance may or may not occur. The description includes instances where the event or circumstance occurs and instances where it does not occur.

While there have been shown, described and pointed out, fundamental novel features of the invention as applied to the exemplary embodiments thereof, it will be understood that various omissions and substitutions and changes in the form and details of devices illustrated, and in their operation, may be made by those skilled in the art without departing from the spirit of the invention. Moreover, it is expressly intended that all combinations of those elements and/or method operations, which perform substantially the same function in substantially the same way to achieve the same results, are within the scope of the disclosure. Moreover, it should be recognized that structures and/or elements and/or method operations shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

Although only a few examples have been described in detail above, those skilled in the art will readily appreciate that many modifications are possible in the examples without materially departing from this subject disclosure. Accordingly, all such modifications are intended to be included within the scope of this disclosure as defined in the following claims. In the claims, means-plus-function clauses are intended to cover the structures described as performing the recited function and not only structural equivalents, but also equivalent structures.

The invention claimed is:

1. An industrial hygiene method comprising:
creating an air stream with an air compressor;
regulating a pressure within the air stream;
using a precision rotameter to split the air stream into a first air stream and a second air stream;
receiving the first air stream with a volatile organic compound (VOC) generator that comprises a plurality of first metal bubblers;
receiving a portion of the second air stream with a humidity generator that comprises a plurality of second metal bubblers;
directing a portion of the first and second air streams to a bed of adsorbent medium to remove contaminants; and
controlling a rate of the first and second air streams so that the bed of adsorbent medium expands by an amount ranging from about 42% to about 51%.

2. The method of claim 1, further comprising sampling air from the bed of absorbent medium with a fluidized bed sampler that comprises:
a tube holder with an inlet for air to flow in and an outlet for the air to flow out;
a top screen or grid disposed in the tube holder closer to the outlet;
a bottom screen or grid disposed in the tube holder closer to the inlet; and
an adsorbent medium disposed between the top screen and the bottom screen.

3. The method of claim 1, further comprising:
directing the first air and second air streams to a fluidized bed sampler,
wherein two bubblers of the plurality of second metal bubblers contain distilled water, wherein the two bubblers of the plurality of second metal bubblers are immersed in a thermal bath to control temperature and vapor pressure of the distilled water; and
wherein a bubbler of the plurality of second metal bubblers traps condensed water vapor.

4. The method of claim 1, wherein,
a first bubbler of the plurality of first metal bubblers contains a predetermined amount of a volatile organic compound; and
a second and a third bubbler of the plurality of first metal bubblers trap condensed VOC vapor.

5. The method of claim 2, wherein the adsorbent medium comprises fluidized activated carbon or charcoal particulates.

* * * * *